March 7, 1961 H. MILLER ET AL 2,973,927
MONITORING DEVICE FOR AUTOMATIC PILOT SYSTEMS
Filed Nov. 21, 1956
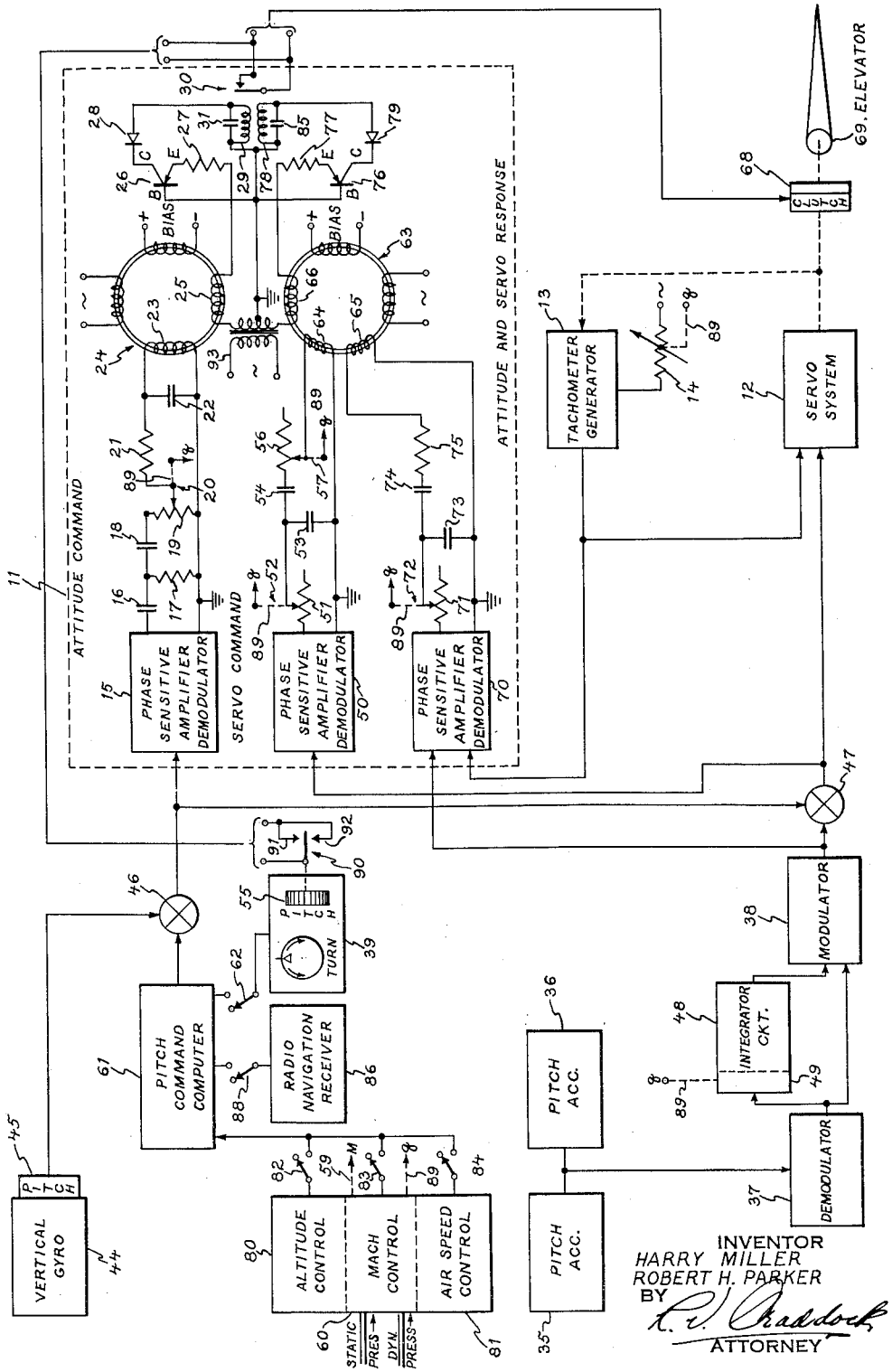
INVENTOR
HARRY MILLER
ROBERT H. PARKER
BY
ATTORNEY

United States Patent Office 2,973,927
Patented Mar. 7, 1961

2,973,927

MONITORING DEVICE FOR AUTOMATIC PILOT SYSTEMS

Harry Miller, Westbury, and Robert H. Parker, New Rochelle, N.Y., assignors to Sperry Rand Corporation, a corporation of Delaware Filed Nov. 21, 1956, Ser. No. 623,592

17 Claims. (Cl. 244—77)

This invention relates to a monitoring device for automatic pilot systems for dirigible craft. In such a system the craft is controlled about its axes by operation of the control surfaces in accordance with motion about the axes to stabilize the craft.

This invention is particularly adaptable to control systems for dirigible craft of the general characteristics shown and described in application No. 571,813 entitled Aircraft Automatic Pilots invented by H. Miller and G. F. Jude filed March 15, 1956, and assigned to the same assignee as the present invention. The monitoring device of the present invention provides a continuous check of the signals in the aforesaid automatic pilot and, upon the occurrence of a malfunction of the automatic pilot, the monitoring device or any of the related components, a signal is provided which modifies the operation of or renders ineffective the automatic pilot. In the aforesaid automatic pilot, short period stabilization is provided by pared linear accelerometers that provide direct measures of angular accelerations about the primary craft axes and velocity type control surface servo systems which directly control the rate of surface movement in accordance with the direct acceleration measures. Long period stabilization is provided in the aforesaid automatc pilot by means of long period inertial references such as vertcal and directional gyros and accelerometers having integrating outputs for measuring or detecting deviations of the aircraft from a desired flight path, i.e., for purposes of flight path stabilization.

When utilized with the aforementioned automatic pilot, the monitoring device of the present invention affords several important advantages. One of the advantages over prior art monitoring systems is that the basic maneuvering sensors are monitored thereby supplementing the monitoring of the servo system. In addition, command compensation is inherent resulting in appreciably more accurate monitoring of the system performance.

With the monitoring system of the present invention no auxiliary sensors are required since the short term reference, i.e. the accelerometers, inherent in the automatic pilot system may be compared with the long term reference i.e. gyros. Previously, as shown in Patent No. 2,487,793 invented by O. E. Esval and P. Halpert entitled Object Controlling Electric Motor System issued November 15, 1949, and assigned to the same assignee as the present invention, accelerometers were added as additional equipment in order to provide a reference signal against which the servo armature voltage could be compared. By pyramiding the auxiliary components which were previously required, the component tolerances were also multiplied thus imposing a limitation on the accuracy with which the system could be monitored without producing nuisance disengaging or tripping. A further disadvantage of the prior art systems is the requirement for complex command compensation that necessitated desensitizing the prior art monitoring devices to the extent that only large amplitude and rapid malfunctions would result in automatic disengagement. The present invention overcomes this limitation by comparing the signals from the basic automatic pilot sensors without adding extensive additional or auxiliary equipment thereby avoiding pyramiding of component tolerances or complex command compensation thus provided a more sensitive, accurate and responsive system with inherent command compensation.

By utilizing the principle of superposition, several channels or portions of the automatic pilot system may be compared with a minimum of additional monitoring equipment.

This is accomplished in the present invention by means of a monitoring device which compares the long term stabilization signal with the short term stabilization signal and also compares the input signal to the servo system with the output response signal of the servo system. Preferably, the signals to be compared, during normal operation, are made compatible by means of circuitry within the monitoring device. By the principle of superposition, three signals are compared in one comparison means that provides an output, during normal operation, of only one of the three signals. In a second comparison means, the output from the first comparison means is then compared with a fourth signal. Means are included within the monitoring device to compensate for changes in parameter control of the automatic pilot system.

The primary object of the present invention is therefore to provide a more accurate monitoring device effective to detect malfunctions of the automatic pilot system, the monitoring device and the components therein.

It is a further object of the present invention to provide a monitoring device which utilizes a minimum of auxiliary components and provides a more accurate response to malfunctions within the system.

Another object of the present invention is to provide a monitoring device for an automatic pilot system wherein parameter control of said automatic pilot system is automatically compensated without sacrificing sensitivity of the monitoring system.

Other objects, features and advantages of the present invention will become more apparent from the following description when read in connection with the drawing wherein:

The drawing is a schematic wiring diagram of the monitoring device when utilized with an automatic pilot system for dirigible craft.

Referring now to the drawing, the present invention will be explained in relation thereto. The automatic pilot of the present invention is substantially similar to that previously described in the aforesaid patent application Serial No. 571,813 with the exceptions to be noted below. For purposes of example, the present invention will be discussed as applied to the pitch axis of the aforementioned automatic pilot. However, it is to be understood that the present invention is applicable also to the other axes of automatic pilot systems.

A pedestal controller 39 is connected through a selector switch 62 to pitch command computer 61. The pedestal controller 39 provides manual pitch rate commands which may be initiated by pitch knob 55. A radio navigation receiver 86 is also connected through selector switch 88 to the pitch command computer 61. The radio receiver 86 provides vertical path control signals which may be received from an instrument landing system glide slope transmitter (not shown) for example. The automatic pilot may also be automatically controlled by an altitude control 80, Mach control 60 and airspeed control 81 which are connected to the pitch command computer 61 through respective selector switches 82, 83, and 84. The airstream data sensors 80, 60 and 81 are arranged to provide shaft rotations as a function of Mach number, M and dynamic pressure, q. Such shafts are illustrated schematically at 59 and 89 respectively. The output of the pitch command computer 61 and the output from the pitch pick off 45 of the vertical gyro 44 are connected together through a suitable comparison device 46. The output of the comparison device 46 is connected to a summing device 47. A pair of linear pitch accelerometers 35 and 36 are suitably disposed in the aircraft and connected together to provide an output that is connected to demodulator 37. A portion of the output of the demodulator 37 is connected to modulator 38. Another portion of the output of the demodulator 37 is connected to integrator circuit 48 through a gain adjustment circuit 49 that may form a part of the integrator circuit 48. The gain adjustment circuit 49 is connected to and controlled by shaft 89 as a function of dynamic pressure, q, or other suitable parameter control signal. The output of the integrator circuit 48 is connected to modulator 38. The output of the modulator 38 is connected to summation device 47, which in turn is connected to servo system 12. The output of the servo system 12 is disengageably connected through a suitable clutch 68 to the elevator control surface 69 of the aircraft. The output of the servo system 12 is also connected to tachometer generator 13 which has its output connected back to the input of the servo system 12. A means to vary the response of the tachometer generator 13 is indicated schematically as a variable resistance 14, the resistance of which is varied as a function of dynamic pressure, q, or other suitable parameter control signal by rotation of shaft 89. The autopilot system described immediately above is similar to that discussed in application Serial No. 571,813 with the exception of the demodulator 37 and modulator 38 which are not shown in the original application for purposes of simplicity. Neither is the gain adjustment circuit 49, which may be included within the integrator circuit 48, specifically disclosed in the aforesaid application.

The output from the comparison device 46 is connected to phase sensitive amplifier demodulator 15 in the attitude command channel of monitoring device 11. The demodulator 15 has two output terminals, one of which is connected through series condenser 16 and series condenser 18 to one end of potentiometer 19. The demodulator 15 is also connected to ground. The junction of condensers 16 and 18 is connected through shunting resistor 17 to ground. The other end of potentiometer 19 is grounded. The slider arm of potentiometer 19 is positionable by a suitable adjustment means schematically indicated at 20 in accordance with a parameter control signal, for example, dynamic pressure by rotation of shaft 89. The slider arm of potentiometer 19 is connected to one end of series resistor 21. The other end of resistor 21 is connected to one side of parallel capacitor 22 and to one end of the input winding 23 of the magnetic modulator 24. The other end of the input winding 23 and the other side of condenser 22 are each connected to ground. The magnetic modulator 24 has an excitation winding energized by a suitable A.C. source and a bias winding energized from a suitable D.C. source. The output winding 25 of magnetic modulator 24 has one end connected to ground through the secondary of transformer 93 and the other end connected to the emitter electrode of transistor amplifier 26 through a suitable resistor 27. The collector electrode of amplifier 26 is connected through a rectifier 28 to one end of one of the coils 29 of a twin coil sensitive relay 30. The other end of coil 29 is connected to a suitable ground. Connected in shunt across the coil 29 is a tuning condenser 31. The leads from the normally closed relay arm of relay 30 connect to clutch 68. The coils 29 and 78 of relay 30 are normally balanced electrically with respect to each other thereby maintaining the relay arm of relay 30 closed as shown in the drawing. In the event the coils 29 and 78 are not electrically balanced, the relay arm of relay 30 is opened and clutch 68 is then disengaged.

The output of the summation device 47 is connected to phase sensitive amplifier demodulator 50 in the servo command channel. The demodulator 50 has two output terminals, one of which is grounded while the other is connected to variable resistor 51. Resistor 51 has a slider arm positionable by a suitable adjustment means 52 as a function of a parameter control signal, such as dynamic pressure by rotation of shaft 89. The slider arm of resistor 51 is connected to one end of shunt condenser 53 and series condenser 54. The other end of condenser 53 is connected to ground. The other side of series condenser 54 is connected to variable resistor 56. The slider arm of resistor 56 is positionable by a suitable adjustment means 57 in accordance with a parameter control signal such as dynamic pressure by rotation of shaft 89. The slider arm of resistor 56 is connected to one end of the input winding 64 of magnetic modulator 63, the other end of winding 64 being connected to ground.

The modulator 38 is connected to phase sensitive amplifier demodulator 70 in the attitude and servo response channel. The tachometer generator 13 is also connected to the phase sensitive amplifier demodulator 70. The demodulator 70 has one output terminal grounded and the other connected to variable resistor 71. Resistor 71 has a slider arm positioned by a suitable adjustment means 72 in accordance with dynamic pressure by rotation of shaft 89. The slider arm is connected to one side of shunt condenser 73 and one side of series condenser 74. The other side of shunt capacitor 73 is connected to ground. The other side of series capacitor 74 is connected to series resistor 75 which in turn is connected to one end of the second input winding 65 of magnetic modulator 63. The other end of input winding 65 is connected to ground. The dual input windings 64 and 65 are identical and form a comparison means of magnetic modulator 63. The magnetic modulator 63 has an excitation coil energized by a suitable A.C. source and a bias coil supplied with a suitable D.C. source. The output winding 66 of magnetic modulator 63 is connected to a suitable ground through the secondary of transformer 93 while the other end is connected to emitter electrode of transistor amplifier 76 through resistor 77. The collector electrode of the transistor amplifier 76 is connected to one end of the other coil 78 of twin coil sensitive relay 30 through a rectifier 79. The other end of the coil 78 is connected to ground. Across the coil 78 is connected a tuning condenser 85.

Operably connected to pitch knob 55 is a bypass switch 90 having contacts 91 and 92 that are connected to the output leads of relay 30. The switching arm of switch 90 is positionably coupled to the pitch knob 55 of pedestal controller 39.

The operation of the system of the present invention will now be discussed with respect to the pitch axis. The long period stabilization is provided by vertical gyro 44. The output from the pitch pick-off 45 of the vertical gyro 44 is compared with the output from the pitch command computer 61. The short period stabilization is provided by paired pitch accelerometers 35 and 36 that generate a signal in accordance with the angular acceleration of the craft around the pitch axis. The angular acceleration signal is demodulated in demodulator 37 to remove the carrier and for quadrature voltage rejection purposes. One portion of the demodulated acceleration signal is applied directly to modulator 38 while the other portion of the acceleration signal passes through a gain adjustment circuit 49 thereby varying the gain of the signal in accordance with dynamic pressure, q such that the gain is decreased as the dynamic pressure is increased. The output of the gain adjustment circuit 49 is integrated in integrator circuit 48 thereby integrating the acceleration signal to provide a rate signal. The time constant of circuit 48 is also varied by circuit 49 as the dynamic pressure is increased. The modulator 38 is thus responsive to acceleration and rate signals in accordance with the movement of the craft around the pitch axis. The modulator 38 modulates the signals providing an output that is algebraically summed with the signals from the gyro 44 and the command computer 61. These signals then provide the input to the servo system 12 which controls the aircraft control surface, i.e., the elevator 69. The aforesaid combination of signals commands a control surface movement. The output of the servo system 12 moves the elevator 69 when the clutch 68 is engaged in accordance with the aforementioned input signals. The output of the servo system 12 is applied to a suitable rate or tachometer generator 13 which provides a feedback signal to the servo system 12 forming a velocity type control surface servo system.

The operation of the monitoring device 11 for the aforesaid automatic pilot will now be described. In the preferred embodiment shown, the monitoring device 11 measures and monitors the entire automatic pilot system, the automatic pilot components and the monitoring means itself by comparing four signals. The monitoring device 11 comprises three channels by means of which four signals are compared and monitored. The monitoring channels include the attitude command channel, the servo command channel and the combined attitude and servo response channel.

The input to the attitude command channel is a signal derived from a comparison of two essentially displacement signals, one corresponding to a desired or commanded attitude as from command computer 61 and the other corresponding to the actual craft attitude as measured by vertical gyro 44. This signal is therefore a measure of the deviation of the craft from a desired flight condition, in this case, from a desired pitch attitude and will be known as the attitude command signal as used herein.

The attitude command signal is applied to phase sensitive amplifier demodulator 15 which demodulates the carrier and rejects quadrature voltage signals. The output of the demodulator 15 is applied to the RC circuit comprising condenser and resistor 17 which is designed to act as a high pass filter. Condenser 16 also acts as a blocking condenser to block the static unbalance signals from the gyro 44, the command computer 61 and the demodulator 15. The output from the RC circuit 16 and 17 is fed to another RC circuit comprising condenser 18 and potentiometer 19 which acts as a defferentiating circuit, thereby differentiating the attitude command displacement signal about the pitch axis to a pitch rate of command signal. The potentiometer 19 also serves the function of establishing the pitch attitude command rate at which the relay 30 will open. The operation of relay 30 will be more fully described later. The wiper arm of the potentiometer 19 is varied in accordance with dynamic pressure, $q$, to provide an amount of compensation equal to the compensation provided by the movement of the wiper arm of potentiometer 71 which in turn compensates for the variation in the adjustment of integrator circuit 48 by circuit 49. The output from the wiper arm of the potentiometer 19 is connected to an RC circuit comprising resistor 21 and condenser 22 that forms a low pass filter. The combination of high pass filter 16 and 17 and low pass filter 21 and 22 comprise a band pass filter, the output of which is connected to the input winding 23 of magnetic modulator 24. The signal from output winding 25 of modulator 24 is amplified in transistor amplifier 26, rectified in rectifier 10 and applied to coil 29 of the D.C. twin coil sensitive relay 30.

The attitude response signal from the output of modulator 38 which is proportional to the rate and acceleration of the performance of the aircraft around the pitch axis is applied to the phase sensitive amplifier demodulator 70 of the attitude and servo response channel. The output of the demodulator 70 is connected to variable resistor 71 which with condenser 73 forms a low pass filter RC circuit that filters out the acceleration term of the pitch attitude response signal, leaving only a rate of pitch attitude response signal. The wiper arm of variable resistor 71 is controlled in accordance with the parameter control signal of the aircraft such that, for example in pitch, the time constant of the RC circuit of 71 and 73 is increased with increased dynamic pressure, $q$, to compensate for the equivalent variation in the lag circuit 48. Condenser 74 and resistor 75 comprise a high pass filter that eliminates the static unbalance and in conjunction with potentiometer 71 and condenser 73 form a band pass filter, the output of which is fed to input windings 65 of dual input winding magnetic modulator 63. The output of the modulator 63 is amplified in transistor amplifier 76 thence rectified through rectifier 79 and applied to coil 78 of twin coil sensitive relay 30. The signal in coil 29 is compared with the signal in coil 78 and if unbalance occurs, in either phase of amplitude, the switching of relay 30 is opened thereby deenergizing the clutch 68 and disengaging the servo system 12 from the elevator control surface 69.

By means of the above, the aircraft attitude command signal from component 46 which is a function of pitch displacement is differentiated to become a pitch rate signal while the aircraft attitude response signal which is proportional to pitch acceleration is divided into pitch acceleration and pitch rate signals. The pitch acceleration signal is filtered out thereby leaving an attitude response pitch rate signal comparable in phase and amplitude, during normal operation, with the attitude command pitch rate signal. Thus the two pitch rate signals may be compared in coils 29 and 78 to detect phase or amplitude unbalance, thereby monitoring the vertical gyro, the command computer and its signal source, the accelerometers and their shaping circuits, and the monitor circuits.

In order to monitor the remainder of the automatic pilot system, the servo system command signal which commands control surface movement is compared with the servo system response signal taken from the output of the tachometer generator 13. The servo command signal and the servo response signal are compared by means of the servo command channel and the attitude and servo response channel, respectively, of the monitoring device 11. The servo command signal is a function of the algebraic summation of the command computer signal compared with the gyro signal and the acceleration and rate signals from modulator 38, i.e., the output of summation device 47. The servo response signal from the tachometer generator 13 is proportional to the response of the servo system and to the response of the control surface. The servo response signal provides a second input signal to the attitude and servo response channel which operates on the signal in a manner similar to the operation previously described for the attitude response signal. The characteristics, including linearity, of the channel are such as to allow superposition of the aforementioned signals.

The servo command signal is applied to phase sensitive amplifier demodulator 50 of the servo command channel. The demodulated output is applied to variable resistor 51 and condenser 53 that form a low pass filter RC circuit. The wiper arm of the resistor 51 is varied in accordance with dynamic pressure, $q$, such that RC circuit 51 and 53 is identical in time constant and frequency response and is varied simultaneously with RC circuit 71 and 73 of the attitude and servo response channel in order to provide identical circuits for the servo command and servo response signals. The output of RC circuit 51 and 53 is connected to condenser 54 and variable resistor 56 to form a high pass filter which in combination with 51 and 53 forms a band pass filter. The wiper arm of variable resistor 56 is varied in accordance with dynamic pressure, $q$, to compensate for the variation of the tachometer generator response as a function of dynamic pressure. The output of resistor 56 is applied to the input winding 64 of dual input winding magnetic modulator 63. The circuit components of the servo command channel are identical to the components of the servo response channel in time constant and frequency response characteristics to provide dual channels through which the servo command and response signals flow with the exception that compensation is provided by resistor 56 in the servo command channel for the variations in the tachometer generator response as a function of dynamic pressure. Condensers 16, 54, and 74 also act as blocking condensers to eliminate static unbalance.

Within the dual winding magnetic modulator 63, the servo command signal on winding 64 is compared with the servo response signal on winding 65. Since the servo response signal is in phase with and proportional to the servo command signal except at low frequency, the aforesaid signals sum to zero unless there is a malfunction of the servo amplifier, servo system, tachometer generator or the monitor circuits. When the aforesaid signals cancel each other in phase and magnitude, the output of the magnetic modulator 63 is proportional to the attitude response signal which is superimposed on input winding 65.

The output signal on output winding 66 of magnetic modulator 63 is amplified and applied as previously described to coil 78 of relay 30. Thus if there is any malfunction in the system, it will be applied across the coils 29 and 78 disconnecting normally closed relay 30 and disengaging the servo system 12 from the control surface 69.

The automatic command signals from the command computer 61 during path control modes are introduced at a controlled low rate such that they do not actuate the relay 30 when applied to the relay coil 29. However, a malfunction which would cause untoward maneuvers during a predetermined limited time period results in disengagement. During rapid manual maneuvers through the pedestal controller 39, actuation of the pitch knob 55 temporarily by-passes the monitoring device 11 by means of by-pass switch 90 to eliminate nuisance tripping. Since the pilot is actively engaged in manually maneuvering the craft during this short period, he would immediately be aware of any malfunction, thereby acting as a human monitoring device.

The primary of transformer 93 is connected to a suitable A.C. source such that the secondary thereof provides a voltage to transistor amplifiers 26 and 76 through output modulator windings 25 and 65 which excite the coils 29 and 78, respectively, of relay 30 in an equal amount. Thus, in the event of a malfunction of either transistor amplifier during a period when no signals are transmitted through the monitoring channels, i.e., when the aircraft is in straight and level flight on the desired flight path, voltage through the operating transistor amplifier will cause the relay 30 to operate to disengage the clutch 68.

In order to provide for failsafe operation of the monitoring device 11 and its associated circuitry in the event of power supply failure, the amplifier which supplies current to coil 29 may be excited from one power supply while the amplifier which supplies current to coil 78 may be excited from another power supply. Then, loss of either power supply would result in actuation of relay 30 due to the resulting unbalance in the standby currents through the coils. If only one power supply is used, it may be separately monitored by its own relay in series with relay 30 which would disengage the clutch 68 in the event of power supply failure.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A monitoring device for an aircraft automatic pilot having long period gyroscopic reference means and short period accelerometer reference means comprising means including said gyroscopic reference means sensing the direction and magnitude of the deviations of the craft from a desired flight condition about an axis for providing a first control signal in accordance therewith, means including said accelerometer reference means sensing the direction and magnitude of accelerations of the craft about said axis for providing a second control signal in accordance therewith, means including servo means responsive to said signals connected to control the movement of the craft in accordance therewith during normal operation of said automatic pilot, means for rendering said signals compatible only during normal operation of said automatic pilot and monitoring device, and means responsive to said signals including means for comparing said signals to render said automatic pilot ineffective when said signals are not compatible.

2. In an aircraft having a control surface for moving the aircraft about an axis including an automatic pilot having a gyroscopic and accelerometer reference means operatively connected to control said surface during normal operation of said automatic pilot, means for producing a signal in accordance with the sense and magnitude of the deviations of the aircraft from a desired flight condition about said axis, means for detecting and producing a signal in accordance with the sense and magnitude of the motion of said craft about said axis, means for producing a signal in accordance with the commanded input to said automatic pilot, means for producing a signal in accordance with the response of said automatic pilot, first comparison means responsive to at least two of said signals for comparing at least two of said signals, second comparison means responsive to the remaining signals for comparing said remaining signals, and means responsive to said comparison means for modifying the operation of said automatic pilot when said signals are not balanced with respect to each other in sense and magnitude.

3. An automatic pilot for dirigible craft movable about an axis including a reversible servo system operable to move the craft about said axis, means providing a first operating signal for the servo system in accordance with the angular displacement of the craft from a reference position about said axis, means providing a second operating signal for the servo system in accordance with the acceleration of the craft about said axis, said signals being operative to control the movement of the craft about said axis only during normal operation of said automatic pilot, means for rendering said signals compatible only during normal operation of said automatic pilot and means responsive to said signals including means for comparing said signals to render said automatic pilot ineffective when said signals are not compatible.

4. An automatic pilot for dirigible craft movable about an axis including a reversible servomotor operable to move the craft about the axis, means providing a first operating signal for the servomotor in accordance with angular displacement of the craft from a reference position about the axis, means for differentiating said first operating signal, means providing a second operating signal for the servomotor in accordance with the acceleration of the craft about the axis, means for integrating said second operating signal, means for detecting malfunctions for providing an output for monitoring the automatic pilot including means responsive to said differentiated and integrated signals for comparing said differentiated and integrated signals, and means for modifying the effectiveness of said automatic pilot whenever said malfunction detecting means provides an output.

5. A system as claimed in claim 4 in which said acceleration signal providing means includes means for varying said signal inversely with dynamic pressure and the comparison means includes means for compensating for said variations.

6. In an aircraft having a control surface for moving the same about an axis, an automatic pilot including a reversible servomotor operatively connected to said surface, means including long period stabilization means for providing a first operating signal in accordance with the angular displacement of the craft from a reference position about said axis, means including short period stabilization means for providing a second operating signal in accordance with the angular acceleration of the craft about said axis, means including flight path reference means for providing a third operating signal in accordance with the deviation of the craft from a desired flight condition with respect to said axis, means responsive to said operating signals for providing a servo command signal to said servomotor in accordance with the desired movement of the control surface, means coupled with said servomotor for providing a servo response signal in accordance with the output of said servomotor and means responsive to said signals including means for comparing said signals to render said servomotor ineffective when said servo command and servo response signals are incompatible with respect to each other.

7. A system as claimed in claim 6 in which said servomotor output signal is variable in accordance with dynamic pressure and said comparison means includes means for compensating for said variations.

8. An automatic pilot for dirigible craft movable about an axis including a reversible servomotor operable to move the craft about the axis, means for providing a first operating signal for the servomotor in accordance with the angular displacement of the craft from a reference position about the axis, means for providing a second operating signal for the servomotor in accordance with the acceleration of the craft about the axis, means for providing a third signal in accordance with the algebraic summation of the first and second signals providing an operating signal for the servomotor, means for providing a fourth signal in accordance with the output of said servomotor, means for rendering said first and second signals compatible, means responsive to said signals for comparing said first signal with said second signal and said third signal with said fourth signal and means responsive to the output of said comparison means if said compared signals are incompatible.

9. A system as described in claim 8 including means for varying said second signal inversely with dynamic pressure and means for compensating said first signal for the variations in said second signal.

10. A system as described in claim 8 including means for integrating a portion of said second signal to provide a signal proportional to the rate of movement of the craft about the axis, filtering means for eliminating the acceleration portion of said second signal and means for differentiating said first signal to provide a rate signal thereby rendering said differentiated first signal and integrated second signal compatible.

11. A system as claimed in claim 8 including first comparison means for comparing said third and fourth signals and second comparison means for comparing said first and second signals.

12. A system as claimed in claim 11 in which said first comparison means is a dual input coil magnetic modulator and said second comparison means is a twin coil sensitive relay.

13. A monitoring device for an automatic pilot for aircraft movable about an axis having long period gyroscopic reference means and short period accelerometer reference means including a reversible servomotor operable to move the craft about the axis, means providing a first operating signal for the servomotor in accordance with the angular displacement of the craft from a reference position about the axis, means providing a second operating signal for the servomotor in accordance with the acceleration of the craft about the axis, means responsive to said first and second signals for providing a third signal in accordance with the algebraic summation of the first and second signals as an input signal to the servomotor, means providing a fourth signal in accordance with the output of said servomotor, means responsive to said first signal for differentiating said first signal, means responsive to said second signal for integrating said second signal, first comparison means for comparing said differentiated first signal and said integrated second signal in opposed relation, second comparison means for comparing said third and fourth signals in opposed relation, and means responsive to said first and second comparison means for rendering said automatic pilot ineffective when said comparison means are unbalanced.

14. A system as claimed in claim 13 including first means for varying the integral of said second signal inversely with dynamic pressure, means for filtering out the acceleration component of said second signal prior to said comparison means, second means for varying the integral of said second signal prior to said comparison means inversely with dynamic pressure to compensate for the first means, means for varying said fourth signal in accordance with dynamic pressure, means for varying the differential of said first signal prior to said comparison means inversely with dynamic pressure to compensate for the variation in the integral of said second signal inversely with dynamic pressure, and means for compensating said third signal prior to said comparison means to compensate for the variation in the fourth signal as a function of dynamic pressure and to compensate for the variation in the integral of said second signal inversely with dynamic pressure introduced by said second means thereby providing balanced channels for each of said signals.

15. A system as claimed in claim 13 in which first comparison means is responsive to the output of said second comparison means.

16. A system as claimed in claim 13 in which said first comparison means comprises a twin coil sensitive relay, one coil of which is responsive to the differential of said first signal and the second coil of which is responsive to the integral of said second signal under normal conditions.

17. A system as claimed in claim 16 in which said second comparison means comprises a dual input coil magnetic modulator wherein said third signal is compared in said first coil of the magnetic modulator with said fourth signal in said second coil in opposing relation and said second coil has superimposed thereon the integral of said second signal whereby the output of said magnetic modulator in the normal operating condition is in accordance with the integral of said second signal only and the second coil of said relay is responsive to the output from said magnetic modulator whereby in the normal operating condition said integral of said second signal is compared in said second coil of said relay with said differential of said first signal in said first coil of said relay in opposing relation wherein any unbalance in the combination of signals actuates said relay to disengage said autopilot system.

References Cited in the file of this patent

UNITED STATES PATENTS

| | | |
|---|---|---|
| 2,487,793 | Esval et al. | Nov. 15, 1949 |
| 2,823,877 | Hess | Feb. 18, 1958 |